United States Patent
Nekomoto et al.

[11] Patent Number: 6,125,977
[45] Date of Patent: Oct. 3, 2000

[54] SELF-TUNING TYPE VIBRATION DAMPING APPARATUS

[75] Inventors: Yoshitsugu Nekomoto; Kazuhiro Matsuki, both of Hyogo-ken, Japan

[73] Assignee: Mitsubishi Heavy Industries, Ltd., Tokyo, Japan

[21] Appl. No.: 08/956,032

[22] Filed: Oct. 22, 1997

[30] Foreign Application Priority Data

Oct. 22, 1996 [JP] Japan ..................................... 8-279452
Sep. 8, 1997 [JP] Japan ..................................... 9-242931

[51] Int. Cl.$^7$ ........................................................ F16F 7/10
[52] U.S. Cl. ............................................. 188/378; 267/136
[58] Field of Search ............................ 188/378; 267/136, 267/140.3; 416/145, 500; 741/574, 604

[56] References Cited

U.S. PATENT DOCUMENTS

| 2,306,959 | 12/1942 | Knibbe . | |
|---|---|---|---|
| 2,349,187 | 5/1944 | Meyer . | |
| 2,462,961 | 3/1949 | Harker . | |
| 2,462,962 | 3/1949 | Harker . | |
| 3,020,980 | 5/1962 | Baker et al. | 188/378 |
| 4,496,335 | 1/1985 | Quick et al. | 267/136 X |
| 4,527,951 | 7/1985 | Trier . | |

FOREIGN PATENT DOCUMENTS

| 2596122A1 | 9/1987 | France . |
|---|---|---|
| 4109964A1 | 10/1991 | Germany . |
| 57-134037 | 8/1982 | Japan . |
| 60-97444 | 7/1985 | Japan . |
| 1210639 | 8/1989 | Japan . |
| 8803585 | 5/1988 | WIPO . |

*Primary Examiner*—Chris Schwartz

[57] ABSTRACT

A self-tuning type vibration damping apparatus for damping vibration of a vibration damping target includes a sphere, and a sphere case attached to the vibration damping target to movably accommodate the sphere.

8 Claims, 12 Drawing Sheets

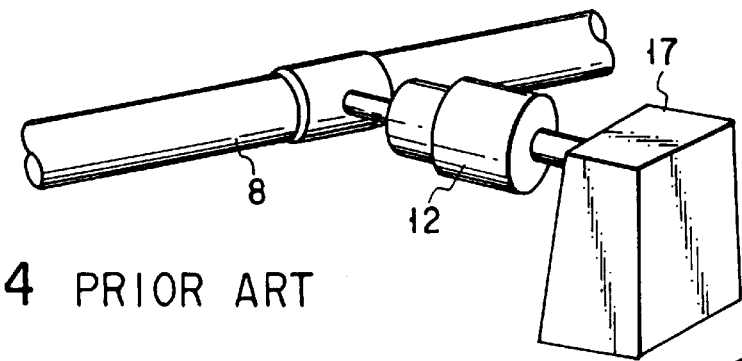
FIG. 4 PRIOR ART
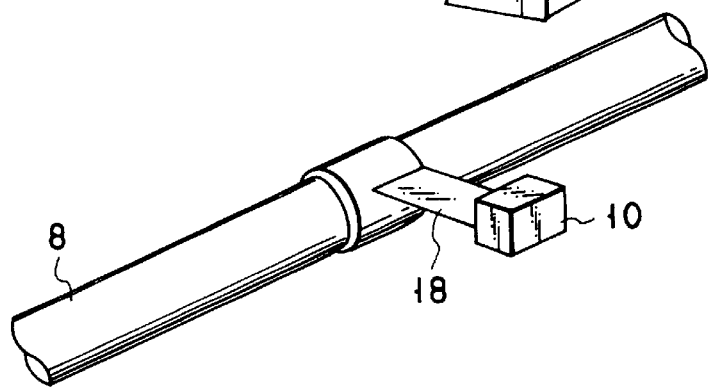
FIG. 5 PRIOR ART
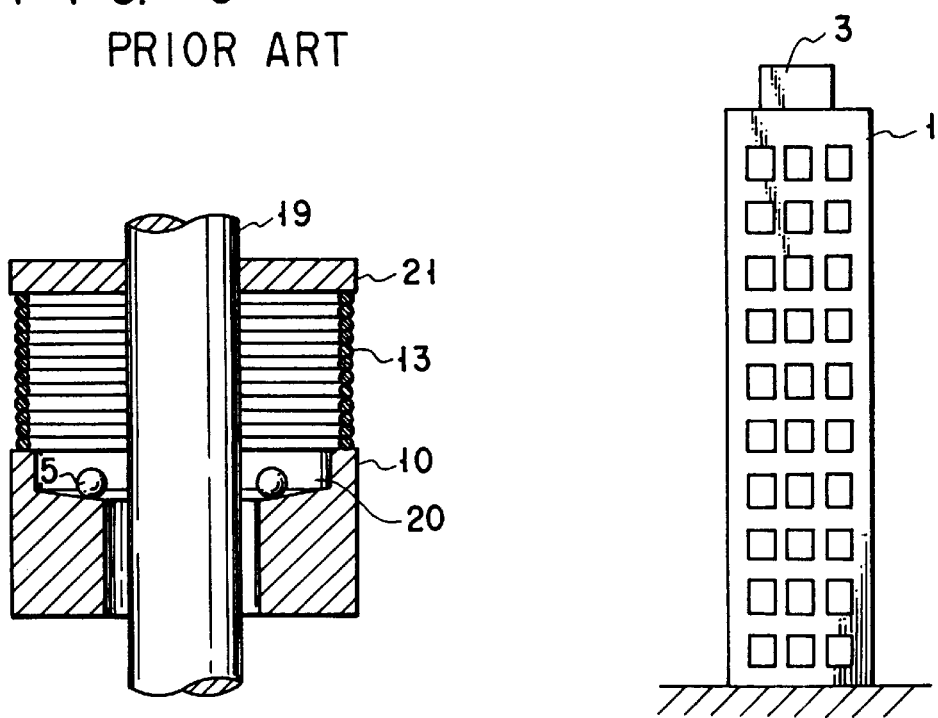
FIG. 6 PRIOR ART
FIG. 7

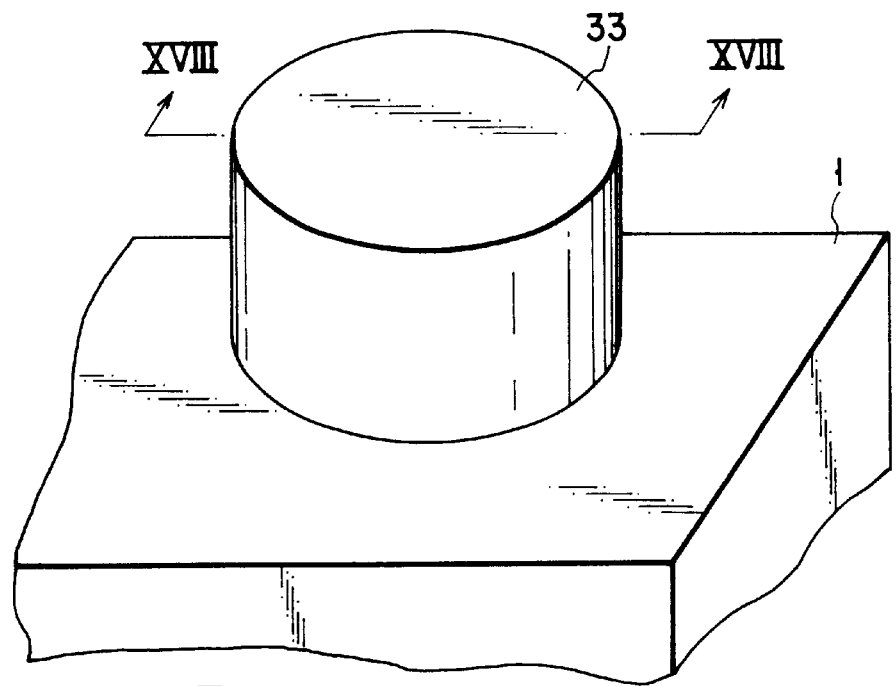
F I G. 17
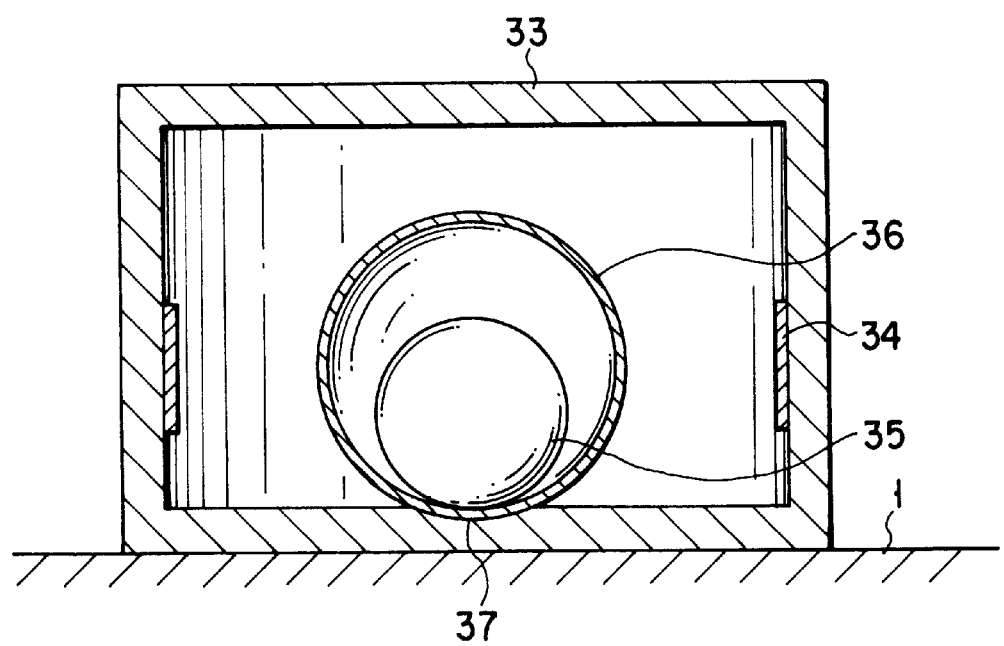
F I G. 18

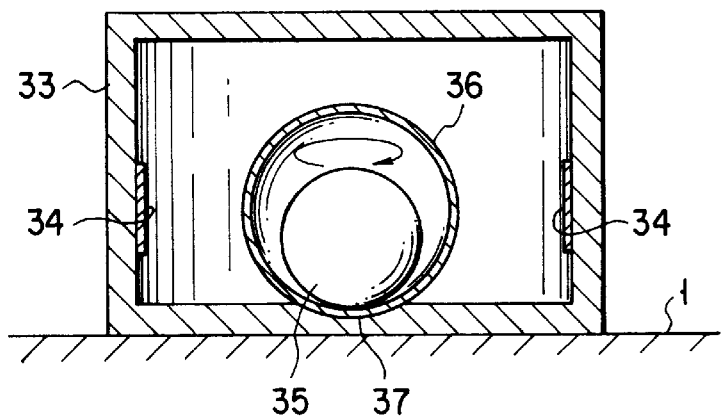
F I G. 21 A
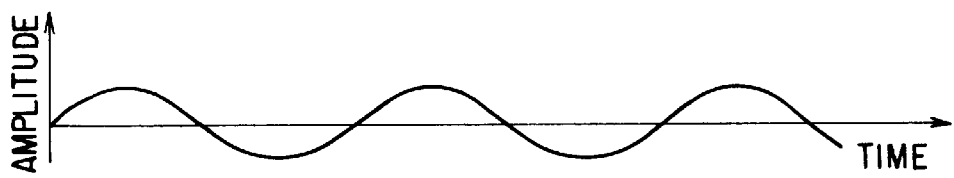
F I G. 21 B
F I G. 21 C
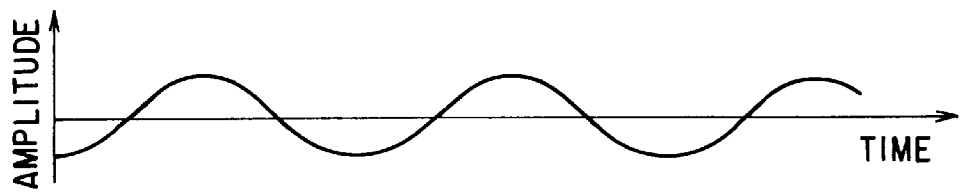
F I G. 21 D

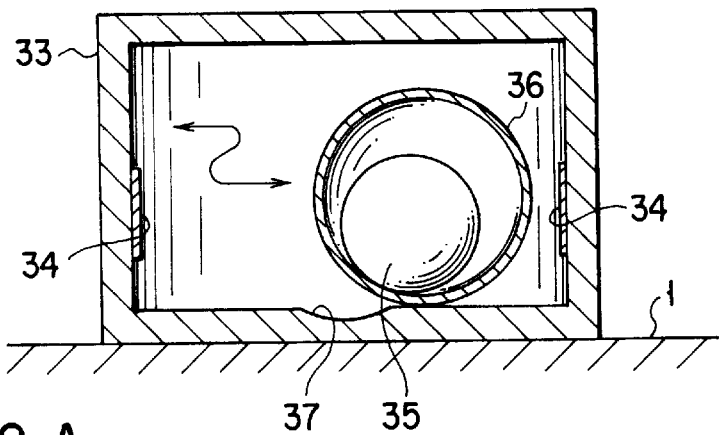
F I G. 22A
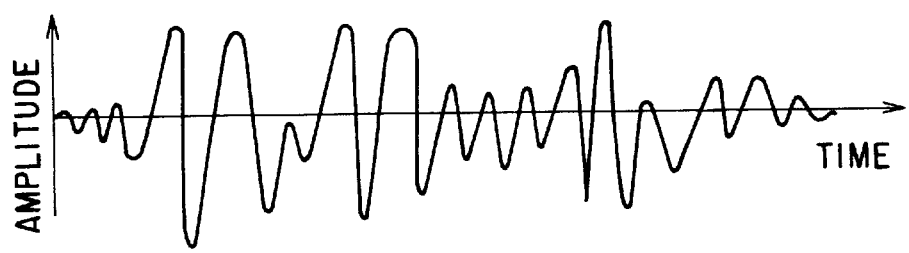
F I G. 22B
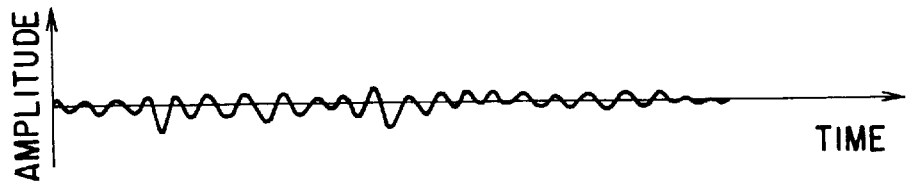
F I G. 22C
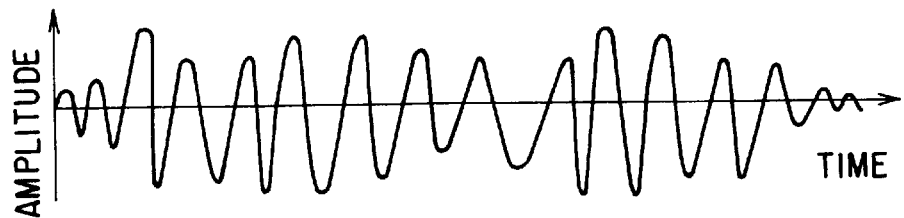
F I G. 22D

SELF-TUNING TYPE VIBRATION DAMPING APPARATUS

BACKGROUND OF THE INVENTION

The present invention relates to a vibration damping apparatus for damping vibration of a structure such as a building or a tower due to wind or earthquake, vibration of piping due to pump operation or pulses, or vibration of equipment due to motor operation and, more particularly, to a self-tuning type vibration damping apparatus for damping vibration of a vibration damping target by utilizing the motion of a sphere tuned to vibration of the target.

A huge structure such as a building, a bridge, or a tower is flexible and readily vibrates. Vibration is excited by a wind external force. A large vibration may break the structure to result in a serious problem. The followings are conventional vibration damping apparatuses as measures against vibration.

(Measure 1)

As shown in FIG. 1, a vibration damping apparatus (this apparatus is called a dynamic vibration damper) comprising a mass 10, a spring 13, and an oil damper 12 is attached on the top of a building 1 (or in the building near the top). The frequency is tuned to the natural frequency of the building 1, thereby reducing vibration.

(Measure 2)

As shown in FIG. 2, an actuator 14 is attached on the top of a building 1, and a mass 10 is driven by the actuator 14, thereby actively reducing vibration.

(Measure 3)

For, e.g., piping, which vibrates due to pump operation or pulses, a support 15 extending from a header pipe 6 is conventionally arranged to damp large vibration of piping 8, as shown in FIG. 3.

(Measure 4)

For, e.g., piping, a fixing table 17 is arranged and coupled to piping 8 through an oil damper 12, as shown in FIG. 4.

(Measure 5)

Like a building, piping can also employ a dynamic vibration damper comprising a mass 10 and a flat spring 18, in which a vibration element of a single-degree-of-freedom system having a frequency equal to that of piping 8 is attached and resonated to reduce vibration of the piping, as shown in FIG. 5.

(Measure 6)

A vibration damping apparatus comprising a mass 10 suspended from a coil spring 13, and a sphere 5 inserted into a groove 20 formed in the mass 10, as shown in FIG. 6, has also been developed as a vibration damping apparatus for a columnar structure. In case of small vibration, the sphere 5 collides against a columnar structure 19. In case of large vibration, the sphere 5 collides against the mass 10 and the columnar structure 19. The vibration energy is transformed to a collision energy, so that the vibration is reduced.

However, the conventional vibration damping apparatuses have the following problems.

(Problem of Measure 1)

To obtain a predetermined vibration damping effect, a vibration damping apparatus comprising a large mass whose frequency is adjusted, a spring, and an oil damper is required, and optimally adjusting the frequency is labor- and cost-intensive. Especially, the spring and oil damper are expensive.

(Problem of Measure 2)

The actuator must actuate a large mass and therefore requires a large energy, resulting in a problem of cost.

(Problem of Measure 3)

To set the support 15, a support attachment band 16 for supporting the support 15 must be arranged, so this apparatus can hardly be set at a portion where a plurality of pipes are complexly arranged.

(Problem of Measure 4)

The oil damper 12 for vibration damping is expensive. In addition, to set the oil damper 12, the fixing table 17 is necessary. In fact, it is difficult to set the oil damper 12. For high-temperature piping, the oil damper 12 can hardly be set because the damper characteristics change with temperature.

(Problem of Measure 5)

Like the vibration damping measure (measure 1) for a building, the frequency must be tuned to that of the target piping 8. The dynamic vibration damper must be designed, manufactured, and adjusted on the basis of the frequency of the piping 8 which is measured in advance.

(Problem of Measure 6)

Since this apparatus is an impulse type vibration damping apparatus, the vibration damping effect is poorer than that of the dynamic vibration damper (measure 1 or 5) for an identical mass ratio (mass of the vibration damping apparatus/weight of the target structure). In addition, wear or impulse sound on the collision surface of the sphere 5 or the mass 10 poses a problem.

BRIEF SUMMARY OF THE INVENTION

It is an object of the present invention to solve the problems of the prior art by damping vibration of a vibration damping target by utilizing the motion of a sphere tuned to the vibration of the vibration damping target, and providing a self-tuning type vibration damping apparatus, which can be easily manufactured and attached and can effectively damp vibrations of various vibration damping targets.

In order to achieve the above object, according to the present invention, there is provided a self-tuning type vibration damping apparatus for damping vibration of a vibration damping target, comprising:

a sphere; and a sphere case attached to the vibration damping target to movably accommodate the sphere.

The apparatus of the present invention having this arrangement need only be set on the vibration damping target and requires no jig, such as a fixing plate. The apparatus can be easily applied to a building, piping, or equipment, which has already been constructed. Since this apparatus employs a vibration damping mechanism using circular motion of the sphere tuned to the vibration of the vibration damping target, the frequency need not be adjusted, unlike a dynamic vibration damper. In addition, the apparatus is constituted by the sphere and the case and therefore can be used where it is exposed to high temperatures in piping or equipment.

In order to achieve the above object, according to the present invention, there is also provided a self-tuning type vibration damping apparatus for damping vibration of a vibration damping target, comprising:

a sphere;

a spherical sphere case for movably accommodating the sphere; and an apparatus case attached to the vibration damping target to movably accommodate the sphere case and having a recessed portion for receiving the sphere case.

The apparatus of the present invention, having this arrangement, is attached to a structure, such as a building, a tower, piping or equipment. For a steady external force, such as wind, the apparatus tunes itself to the vibration of the target (building, tower, piping, or equipment) to damp the vibration of the target structure using the circular motion of the sphere. For a transient external force, such as an earthquake having a high input level, the vibration of the target structure is damped using the collision vibration of the sphere and the sphere case. For a steady external force such as wind or pump vibration, the vibration is damped using the circular motion of the sphere tuned to the vibration of the target. Unlike a dynamic vibration damper, the frequency need not be adjusted, and a smooth vibration damping effect can be obtained in response to a very low vibration level. For a transient vibration such as an earthquake, whose input is large, the sphere generates collision vibration in the apparatus case together with the sphere case, thereby reducing the vibration of the target structure. With this mechanism, not only low-level vibration but also high-level vibration such as an earthquake can be damped.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a perspective view showing another conventional vibration damping apparatus (measure 4) for piping;

FIG. 5 is a perspective view showing still another conventional vibration damping apparatus (measure 5) for piping;

FIG. 6 is a sectional view showing a conventional vibration damping apparatus (measure 6) for a columnar structure;

FIG. 7 is a view showing an application example of a vibration damping apparatus of the first embodiment of the present invention to a building;

FIG. 17 is a perspective view showing an application example of a vibration damping apparatus of the third embodiment of the present invention to a building;

FIG. 18 is a sectional view taken along a line XVIII—XVIII in FIG. 17;

FIGS. 21A to 21D are views showing the relationship between the motion of the sphere and the vibration damping effect in case of a wind load;

FIGS. 22A to 22D are views showing the relationship between the motion of the sphere in a movable sphere case and the vibration damping effect in case of an earthquake load.

DETAILED DESCRIPTION OF THE INVENTION

The embodiments of the present invention will be described with reference to the accompanying drawings.

Figure 1:
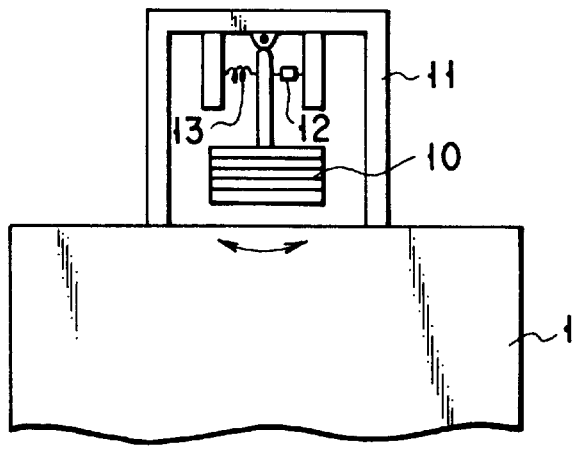
FIG. 1 is a sectional view showing a conventional vibration damping apparatus (measure 1) for a building.
Figure 2:
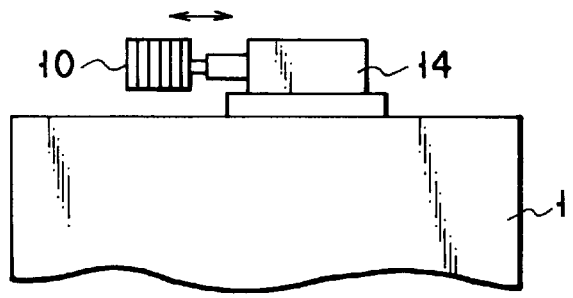
FIG. 2 is a side view showing another conventional vibration damping apparatus (measure 2) for a building.
Figure 3:
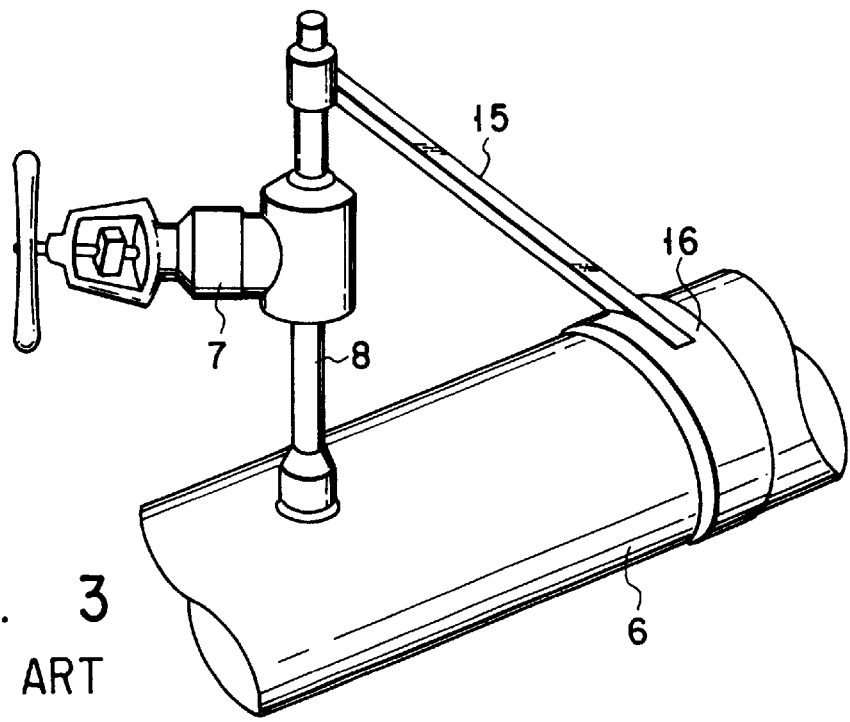
FIG. 3 is a perspective view showing a conventional vibration damping apparatus (measure 3) for piping.
Figure 8:
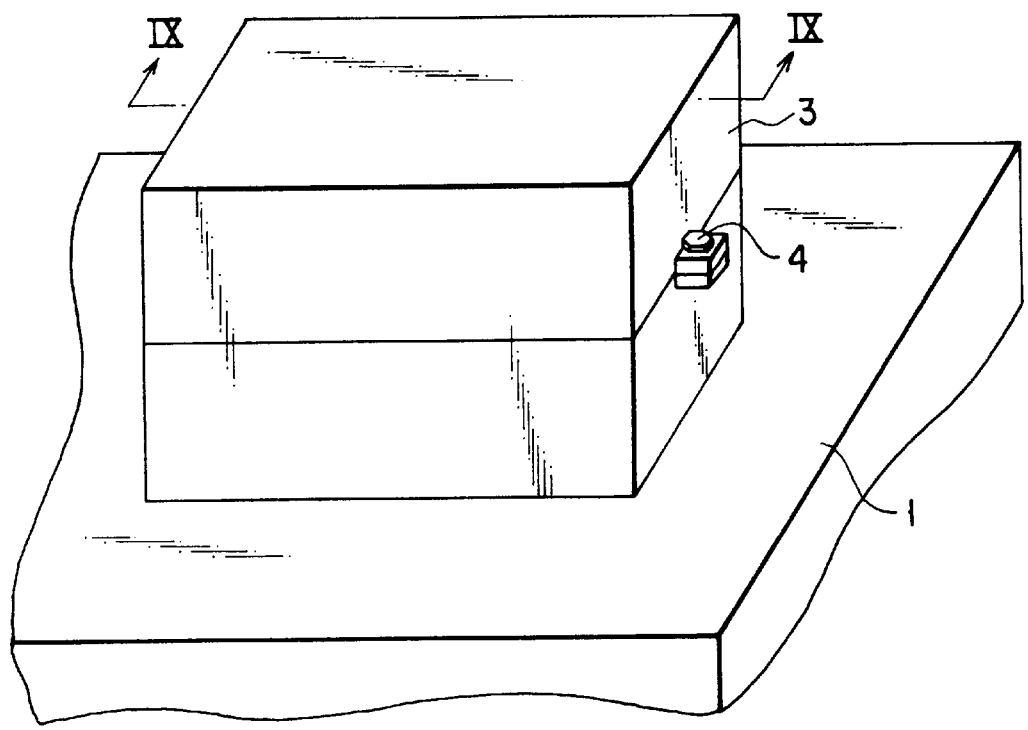
FIG. 8 is a perspective view of the vibration damping apparatus according to the first embodiment.
Figure 9:
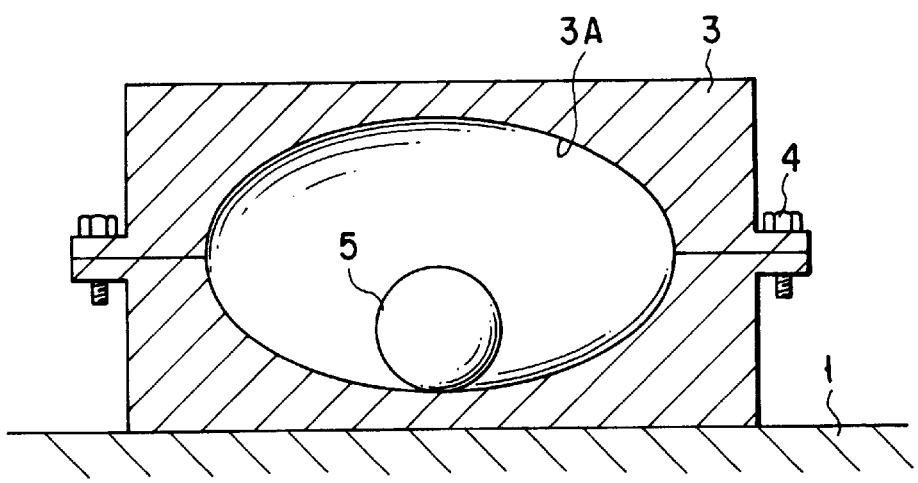
FIG. 9 is a sectional view taken along a line IX—IX in FIG. 8.

A vibration damping apparatus of the present invention is a self-tuning type vibration damping apparatus for damping vibration of a vibration damping target by utilizing the motion of a sphere tuned to the vibration of the vibration damping target. FIGS. 7 to 9 show, as the first embodiment, a vibration damping apparatus whose vibration damping target is a building.

Figure 10:
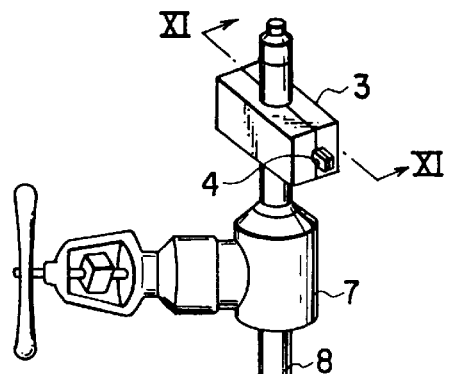
FIG. 10 is a perspective view showing an application example of a vibration damping apparatus of the second embodiment of the present invention to piping.
Figure 11:
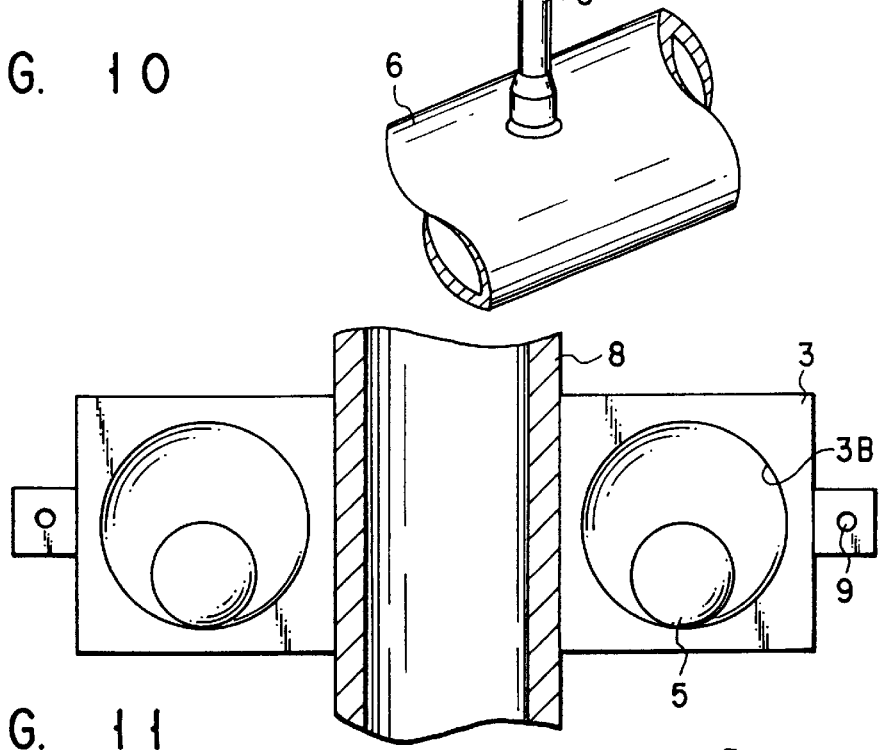
FIG. 11 is a sectional view taken along a line XI—XI in FIG. 10.
Figure 12:
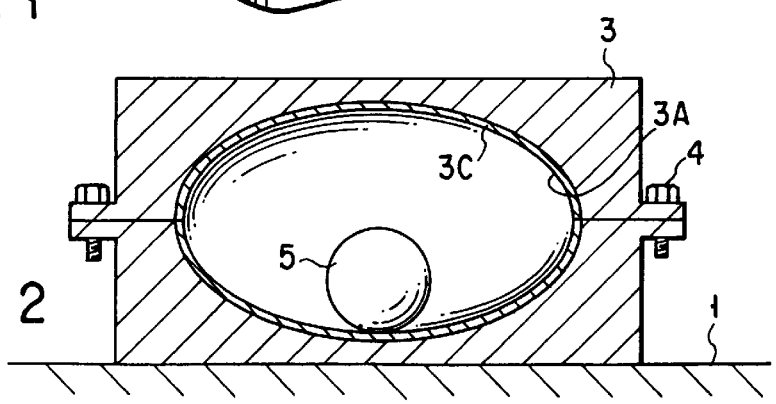
FIG. 12 is a sectional view showing a modification of the vibration damping apparatus according to the first embodiment.

FIGS. 10 and 11 show, as the second embodiment, a vibration damping apparatus whose vibration damping target is piping. FIG. 12 shows a modification of the vibration damping apparatus of the first embodiment.

The vibration damping apparatus of the first embodiment will be described first with reference to FIGS. 7 to 9. A sphere 5 of the vibration damping apparatus according to the first embodiment is inserted into a sphere case 3 having a hollow portion (cavity, shell) 3A with an elliptical section. The sphere case 3 is set on top of a building 1 as a vibration damping target (or in the building 1 near the top). The sphere case 3 for receiving the sphere 5 is divided such that the sphere 5 can be readily inserted. The divided portions of the sphere case 3 are jointed with bolts 4.

In the vibration damping apparatus of the first embodiment having the above arrangement, when the building 1 vibrates, the sphere 5 generates smooth circular motion in the hollow portion 3A having an elliptical section in the sphere case 3. The bottom surface of the sphere case 3 is elliptical and smooth. Even when input is small, i.e., the vibration level of the target structure is low, a radius $\underline{r}$ of gyration can be made large, and a large vibration damping force can be obtained.

A vibration damping apparatus for piping will be described next as the second embodiment with reference to FIGS. 10 and 11. One or a plurality of spheres 5 are inserted into one or a plurality of sphere cases 3 each having a spherical hollow portion 3B, respectively. The sphere cases 3 are attached to piping 8 as a vibration damping target. The sphere case 3 for receiving the sphere 5 is divided in consideration of insertion of the sphere 5 and attachment of the sphere case 3. The divided pieces of the sphere case 3 are jointed with bolts 4. When the piping 8 vibrates, the sphere 5 generates circular motion in the spherical hollow portion 3B of the sphere case 3. When the control target is the piping 8, a large acceleration can be obtained as an input (a problem often arises when the vibration level of the piping 8 is high). For this reason, the bottom surface of the sphere case 3 where the sphere 5 contacts the sphere case 3 also has a spherical shape.

As a modification of the first embodiment, a vibration phase adjustment member 3C formed from a material selected from urethane, rubbers, plastics, and metals can be bonded to the inner surface of the sphere case 3, as shown in FIG. 12, to adjust the vibration phase between the target structure and the sphere 5.

In the vibration damping apparatus of the first or second embodiment having the above arrangement, when the building 1 vibrates, the sphere 5 generates circular motion in the hollow portion 3A having an elliptical section or the spherical hollow portion 3B of the sphere case 3. Vibration damping effects in case of a large input and in case of a small input will be described below.

Figure 13A:
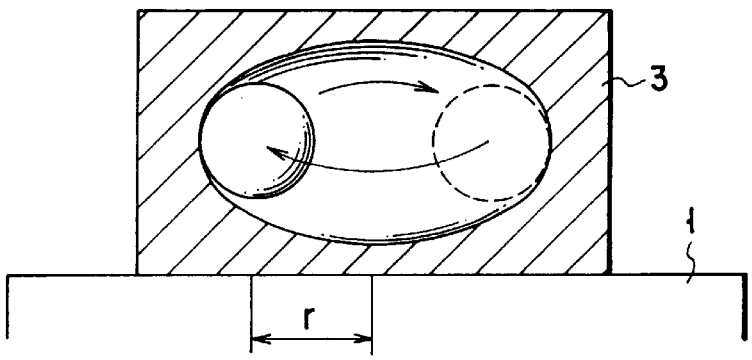
FIGS. 13A to 13D are views showing the relationship between the motion of a sphere and the vibration damping effect when the level of an input to the vibration damping apparatus according to the first or second embodiment is high.
Figure 13B:
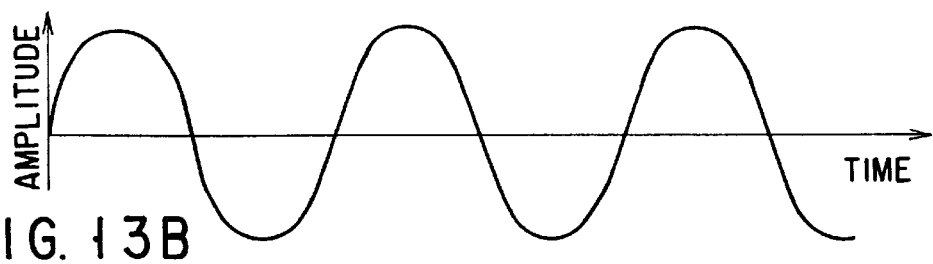
Figure 13C:
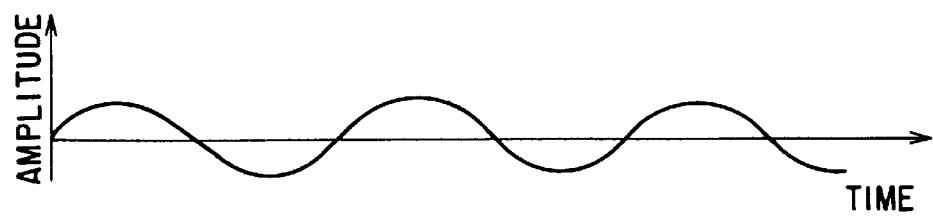
Figure 13D:
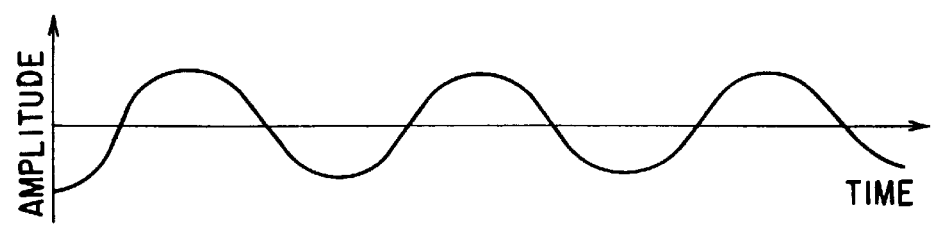

When the input is large (the vibration level of the target structure is high), the sphere 5 generates a circular motion along the side surface of the sphere case 3, as shown in FIGS. 13A to 13D. FIG. 13A shows the circular motion of the sphere 5 in the sphere case 3. FIGS. 13B and 13C show the responses of the vibration damping target (building). FIG. 13B shows the response of the vibration damping target (building) without the vibration damping apparatus of the first embodiment. FIG. 13C shows the response of the vibration damping target (building) having the vibration damping apparatus of the first embodiment. FIG. 13D shows the amplitude of the sphere 5 in the sphere case 3. In FIG. 13A, $\underline{r}$ represents the radius of circular motion. As the radius $\underline{r}$ increases, the vibration damping effect of the sphere 5 becomes large.

As is apparent from FIGS. 13A to 13D, when the vibration level of the target structure is high, the vibration can be effectively damped by the vibration damping apparatus of the first embodiment.

Figure 14A:
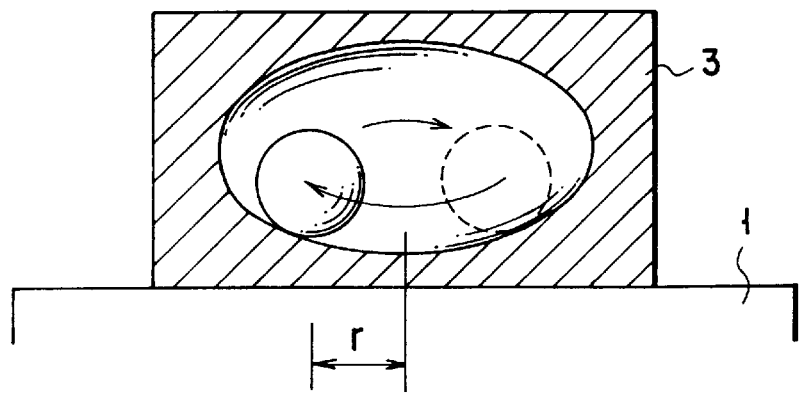
FIGS. 14A to 14D are views showing the relationship between the motion of the sphere and the vibration damping effect when the level of the input to the vibration damping apparatus of the present invention is low.
Figure 14B:
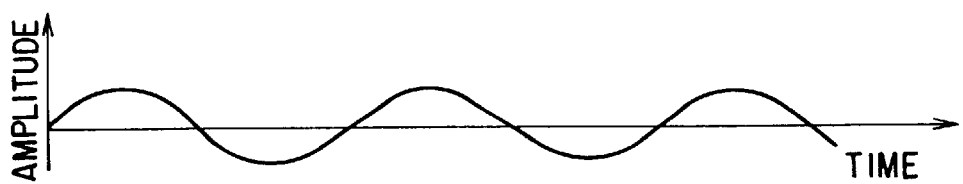
Figure 14C:
Figure 14D:
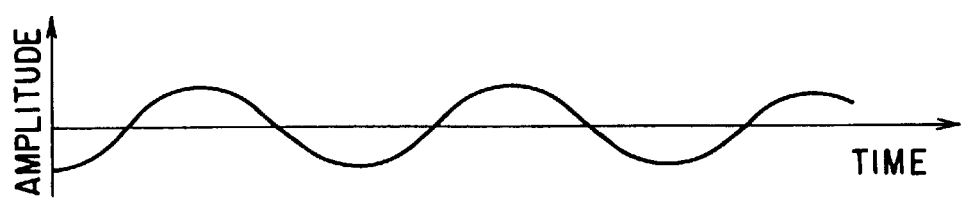

When the input is small (the vibration level of the target structure is low), the sphere 5 generates circular motion along the bottom surface of the sphere case 3, as shown in FIGS. 14A to 14D. FIG. 14A shows the circular motion of the sphere 5 in the sphere case 3. FIGS. 14B and 14C show the responses of the vibration damping target (building). FIG. 14B shows the response of the vibration damping target (building) without the apparatus of the present invention. FIG. 14C shows the response of the vibration damping target (building) having the apparatus of the present invention. FIG. 14D shows the amplitude of the sphere 5 in the sphere case 3. In FIG. 14A, $\underline{r}$ represents the radius of circular motion. As the radius $\underline{r}$ increases, the vibration damping effect of the sphere 5 becomes large.

As is apparent from FIGS. 14A to 14D, even when the vibration level of the target structure is low, vibration can be effectively damped by the vibration damping apparatus of the first embodiment.

Figure 15:
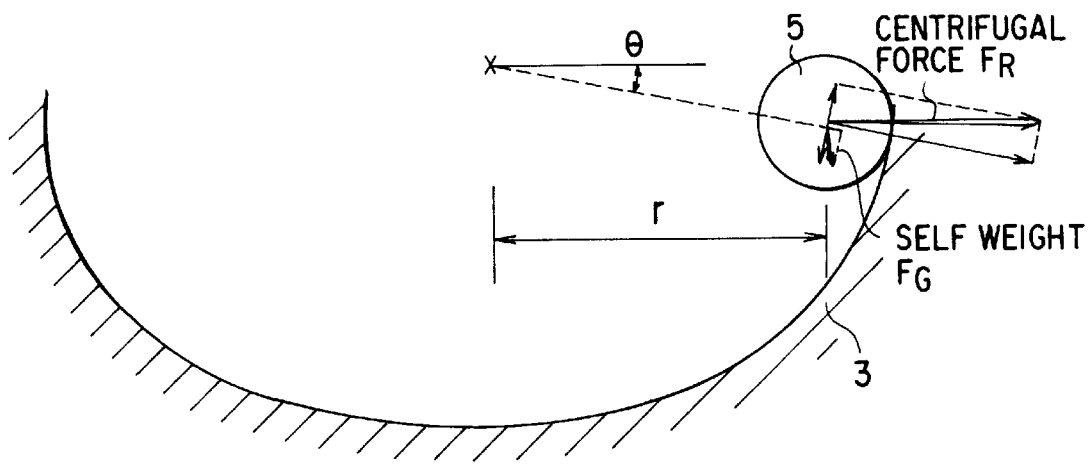
FIG. 15 is a diagram showing the relationship between the input and a circular motion radius $\underline{r}$.
Figure 16:
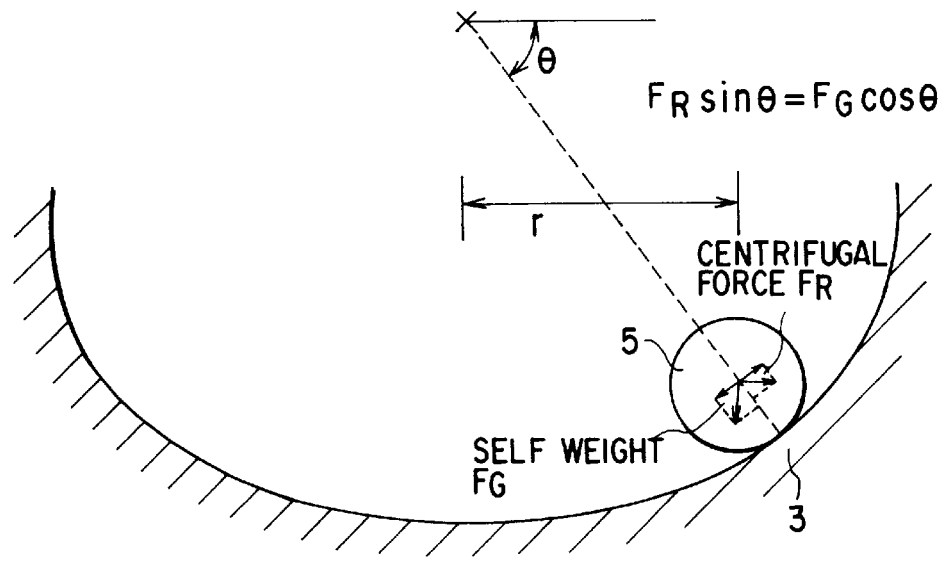
FIG. 16 is a diagram showing the relationship between the input and the circular motion radius $\underline{r}$.

The relationship between the input and the radius $\underline{r}$ will be described next with reference to FIGS. 15 and 16. In FIGS. 15 and 16, a centrifugal force $F_R$ generated by rolling of the sphere 5 and a self weight $F_G$ balance as given by equation (1) below $$F_R \cdot \sin\theta = F_G \cdot \cos\theta \tag{1}$$

As shown in FIG. 15, when the input is large, the centrifugal force $F_R$ increases, and the force balancing the self weight $F_G$ becomes large. The sphere 5 can roll along the side surface of the sphere case 3.

As shown in FIG. 16, when the input is small, the centrifugal force $F_R$ decreases, and the force balancing the self weight $F_G$ becomes small. The sphere 5 rolls on the bottom surface of the sphere case 3. When the bottom surface has a smooth elliptical section, the radius $\underline{r}$ of gyration can be increased, so that the vibration damping force can be increased in proportion to the radius $\underline{r}$.

As shown in FIGS. 13A to 13D and FIGS. 14A to 14D, the sphere 5 rolls at a phase of 90° with respect to the vibration damping target (e.g., a building) and acts on the target as an attenuation force. Therefore, the vibration of the target is reduced.

The effects of the above-described first and second embodiments will be described below. Vibration of a structure such as a building or a tower due to wind disturbance or vibration of piping or equipment due to pump operation or pulses can be reduced by the apparatus of the first or second embodiment.

The vibration damping apparatus of the first or second embodiment need only be set on the vibration damping target and can be easily applied to a building, a tower, piping, or equipment which has already been constructed.

The vibration damping apparatus of the first or second embodiment is constituted by the sphere 5 and the sphere case 3 and therefore has a compact and small-scale arrangement. Since neither a spring nor a damper is required, the apparatus is inexpensive.

The vibration damping apparatus of the first or second embodiment does not have any member, such as an actuator, which requires a power supply and need no energy supply.

The vibration damping apparatus of the first or second embodiment has a simple arrangement; the sphere 5 rolls in the sphere case 3, and therefore is maintenance-free.

The vibration damping apparatus of the first or second embodiment has a compact and small-scale arrangement, and therefore is inexpensive.

The vibration damping apparatus of the first or second embodiment requires neither a support nor a band and can be easily set in a narrow space.

When the sphere 5 and the sphere case 3 are made of a metal, the vibration damping apparatus of the first or second embodiment can be used even at high temperatures and can be applied to piping or equipment exposed to high temperatures.

The vibration damping apparatus of the first or second embodiment need no frequency adjustment and can be applied to a structure such as a tower under construction where the frequency changes.

When the vibration damping apparatus of the first or second embodiment uses the sphere case 3 having an elliptical section, a large vibration damping effect can be obtained even in case of a very low vibration level.

The vibration damping apparatus of the first or second embodiment has no impulse surface, so the problem of wear does not arise.

The third embodiment will be described next. FIGS. 17 and 18 show the third embodiment of the present invention (the vibration damping target is a building). In the third embodiment, a sphere 35 is inserted into a spherical sphere case 36, as shown in FIGS. 17 and 18. The sphere case 36 is placed in an apparatus case 33 on a sphere case receiving portion 37, i.e., a recessed portion. A cushion 34 serving as a cushioning member for the sphere case 36 is set on the inner side wall of the apparatus case 33.

According to this arrangement, the sphere 35 rolls in the sphere case 36 in response to an external force such as wind whose input level is relatively low, thereby damping vibration of the target structure. For a relatively large input such as an earthquake, the sphere 35 rolls out from the sphere case receiving portion 37 together with the sphere case 36 and generates collision vibration in the apparatus case 33, thereby damping vibration of the target structure.

Figure 19:
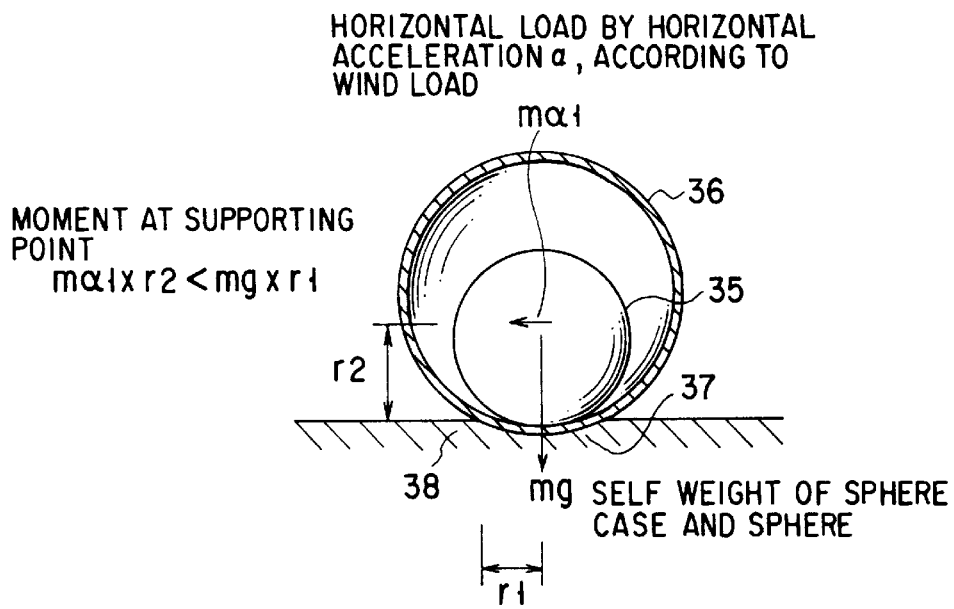
FIG. 19 is a sectional view showing the relationship between the acceleration and the sphere case rolling condition.
Figure 20:
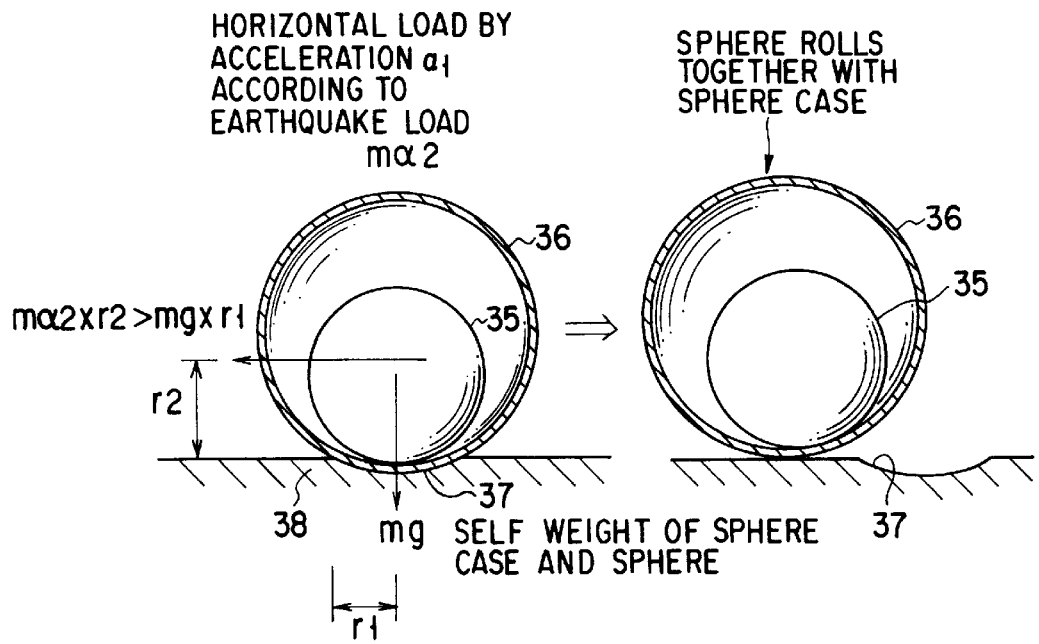
FIG. 20 is a sectional view showing the relationship between the acceleration and the sphere case rolling condition.

FIGS. 19 and 20 show the relationship between acceleration levels acting on the sphere 35 and the rolling condition, which defines whether the sphere case 36 rolls out from the sphere case receiving portion 37. In case of a steady external force such as wind whose input level is relatively low, the moment at supporting point 38 is represented by inequality (2) below where $\alpha_1$ is the acceleration acting on the sphere. The sphere 35 and the sphere case 36 do not roll out from the sphere case receiving portion 37.

$$m\alpha_1 \times r_2 < mg \times r_1 \quad (2)$$

When an external force such as an earthquake external force having a relatively high input level acts, the moment at the supporting point 38 is represented by inequality (3) below where $\alpha_2$ is the acceleration acting on the sphere. The sphere 35 and the sphere case 36 roll out from the sphere case receiving portion 37, and the sphere 35 vibrates in the apparatus case 33 together with the sphere case 36.

$$m\alpha_2 \times r_2 > mg \times r_1 \quad (3)$$

FIGS. 21A to 21D show the vibration damping effect of the apparatus for a steady external force such as a wind load having a relatively low input level. FIG. 21A shows the circular motion of the sphere 35 in the sphere case 36. FIGS. 21B and 21C show the responses of the vibration damping target (building). FIG. 21B shows the response of the vibration damping target (building) without the apparatus of the present invention. FIG. 21C shows the response of the vibration damping target (building) having the apparatus of the present invention. FIG. 21D shows the amplitude of the sphere 35 in the sphere case 33 of the apparatus of the present invention.

The sphere 35 generates circular motion in the sphere case 36 at a phase of 90° with respect to the target structure. The centrifugal force of the sphere acts on the target structure as an attenuation force, so the vibration is damped.

FIGS. 22A to 22D and FIGS. 23A to 23D show the vibration damping effect of the apparatus for a transient earthquake load. FIG. 22A shows a case wherein the sphere 35 rolls together with the sphere case 36. FIGS. 22B and 22C show the responses of the vibration damping target (building). FIG. 22B shows the response of the vibration damping target (building) without the apparatus of the present invention. FIG. 22C shows the response of the vibration damping target (building) having the apparatus of the present invention. FIG. 22D shows the amplitude of the sphere case 36 and the sphere 35 of the apparatus of the present invention.

As shown in FIGS. 22A to 22D, when a large earthquake load acts, the sphere 35 rolls out from the sphere case receiving portion 37 together with the sphere case 36 and generates collision vibration in the apparatus case 33, thereby reducing the vibration of the target structure.

Figure 23A:
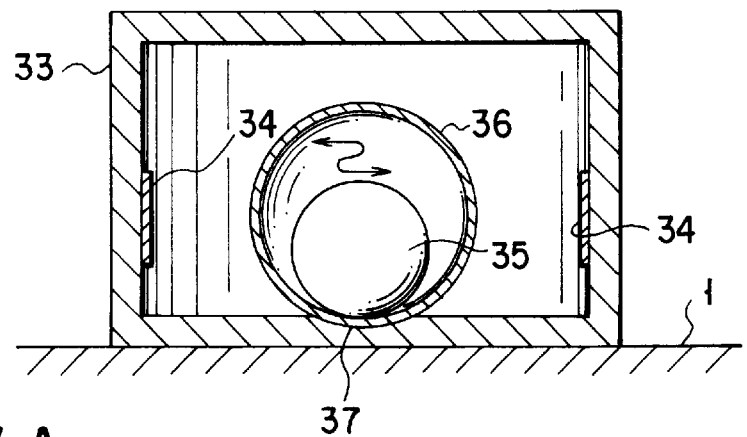
FIGS. 23A to 23D are views showing the relationship between the motion of the sphere in a fixed sphere case and the vibration damping effect in case of an earthquake load.
Figure 23B:
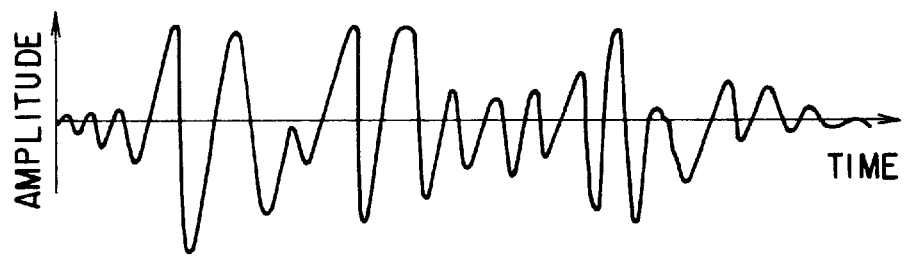
Figure 23C:
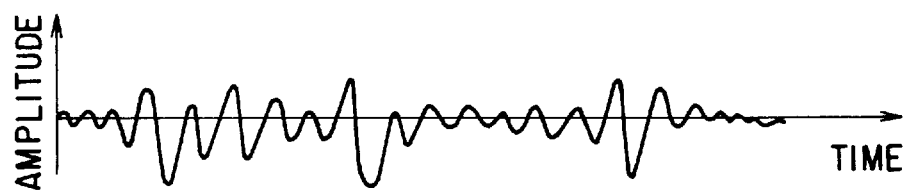
Figure 23D:
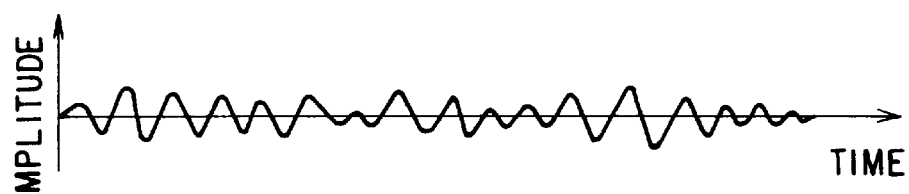

FIG. 23A shows the vibration damping effect obtained when the sphere case 36 is fixed, and the sphere 35 rolls only in the sphere case 36. FIGS. 23B and 23C show the responses of the vibration damping target (building). FIG. 23B shows the response of the vibration damping target (building) without the apparatus of the present invention. FIG. 23C shows the response of the vibration damping target (building) having the apparatus of the present invention. FIG. 23D shows the amplitude of the sphere 35 of the apparatus of the present invention.

As shown in FIGS. 23A to 23D, when the sphere case 36 is fixed, the range of motion of the sphere 35 is limited to the internal space of the sphere case 36, resulting in a small vibration reduction effect.

The vibration damping apparatus of the present invention need no frequency adjustment and can be applied to a structure such as a tower under construction where the frequency changes.

The effects of the above-described third embodiment will be described below. Steady vibration of a structure, e.g., vibration of a building or a tower due to wind disturbance or vibration of piping due to pump vibration can be reduced by the apparatus of the third embodiment using the circular motion of the sphere.

The vibration damping apparatus of the third embodiment can reduce vibration due to a transient external force, such as an earthquake external force having a relatively high input level by utilizing collision vibration of the sphere 35 and the sphere case 36.

The vibration damping apparatus of the third embodiment need only be set on the target structure and can be easily set on a building, a tower, equipment, or piping, which has already been constructed.

The vibration damping apparatus of the third embodiment is constituted by the sphere 35, the sphere case 36, and the apparatus case 33, and therefore has a compact and small-scale arrangement. Since neither a spring nor a damper is required, the apparatus is less costly.

The vibration damping apparatus of the third embodiment does not have any member, such as an actuator, which requires a power supply and need no energy supply.

The vibration damping apparatus of the third embodiment has a simple arrangement; the sphere 5 rolls in the sphere case 3, and therefore is maintenance-free.

The vibration damping apparatus of the third embodiment need no frequency adjustment and can be easily applied to a structure, such as a tower under construction, where the frequency changes.

For vibration having a very low level, the vibration damping apparatus of the third embodiment damps vibration by utilizing the circular motion of the sphere. When the vibration has a high level, the vibration is damped by the collision vibration of the sphere 35 and the sphere case 36. For this reason, vibration can be reduced independently of the input level.

As has been described above in detail, according to the present invention, vibration of the vibration damping target is damped by utilizing the motion of the sphere tuned to the vibration of the vibration damping target. With this arrangement, the problems of the prior art can be solved, and a self-tuning type vibration damping apparatus, which can be easily manufactured and attached while effectively damping the vibrations of various vibration damping targets can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A self-tuning type vibration damping apparatus for damping vibration of a vibration damping target, comprising:

a sphere; and a sphere case attached to said vibration damping target, said sphere case having a hollow portion to movably accommodate said sphere therein, an entire surface of said hollow portion being continuously curved, said sphere damps the vibration in conjunction with said sphere case, wherein said sphere case has an adjustment member for adjusting a vibration phase between said vibration damping target and said sphere.

2. An apparatus according to claim 1, wherein said sphere case the hollow portion having an elliptical section.

3. An apparatus according to claim 1 wherein the hollow portion is spherical.

4. An apparatus according to claim 1, wherein said sphere case has a divided structure formed from a plurality of portions.

5. An apparatus according to claim 1, wherein said adjustment member is essentially formed from a material selected from the group consisting of urethane, rubbers, plastics, and metals, or combinations thereof.

6. An apparatus according to claim 1, wherein said sphere and said sphere case essentially consist of a metal.

7. A self-tuning type vibration damping apparatus for damping vibration of a vibration damping target, comprising:

a sphere;

a spherical sphere case for movably accommodating said sphere; and an apparatus case attached to said vibration damping target to movably accommodate said sphere case and having a recessed portion serving as a sphere case receiving portion for receiving said sphere case, wherein a first vibration is damped by said sphere, in conjunction with said spherical sphere case, while said spherical sphere case is being received in said recessed portion, and a second vibration, greater than the first vibration, is damped by said sphere, in conjunction with said spherical case and said apparatus case, while said spherical sphere case is being released from said recessed portion.

8. An apparatus according to claim 7, further comprising:

a cushion arranged in said apparatus case to cushion an impulse of collision of said sphere case.

* * * * *